United States Patent [19]
Musco

[11] Patent Number: 6,164,502
[45] Date of Patent: Dec. 26, 2000

[54] VARIABLE VOLUME SILO FOR IN-BULK SUPPLIED ARTICLES

[76] Inventor: Ezio Piero Mario Musco, Via Belvedere, 26, 24016 S. Pellegrino Terme, Italy

[21] Appl. No.: 09/295,552

[22] Filed: Apr. 21, 1999

[30] Foreign Application Priority Data

Jan. 7, 1999 [IT] Italy .................................. MI99A0015

[51] Int. Cl.[7] .................................................. G01F 11/00
[52] U.S. Cl. ............................................................ 222/405
[58] Field of Search ................................. 222/185.1, 287, 222/288, 289, 404, 405, 406, 415; 198/367; 414/305, 306, 325, 327

[56] References Cited

U.S. PATENT DOCUMENTS

| | | | |
|---|---|---|---|
| 1,279,089 | 9/1918 | Dolbear | 222/404 |
| 2,767,536 | 10/1956 | Forkel | 53/236 |
| 3,045,846 | 7/1962 | Clark | 214/310 |
| 4,643,291 | 2/1987 | Counter et al. | 198/356 |
| 5,017,074 | 5/1991 | Fabbri | 414/224 |
| 5,176,299 | 1/1993 | Krooss | 222/405 |
| 5,217,104 | 6/1993 | Pelletier | 198/367 |
| 5,452,786 | 9/1995 | Gilmore | 198/367 |

FOREIGN PATENT DOCUMENTS

| | | | |
|---|---|---|---|
| 000493219 | 7/1992 | European Pat. Off. | 198/367 |
| 001964396 | 12/1969 | Germany | 222/405 |
| 404112124 | 4/1992 | Japan | 198/367 |
| 000400901 | 4/1963 | Switzerland | 198/367 |

*Primary Examiner*—Joseph A. Kaufman
*Assistant Examiner*—Melvin A. Cartagena
*Attorney, Agent, or Firm*—Hedman, Gibson & Costigan, P.C.

[57] ABSTRACT

The invention relates to a variable volume silo for in-bulk supplied articles, comprising a box-like body, an inlet region for introducing articles into the silo, outlet regions for discharging articles downward of the silo, and a flexible belt element entrained between two end portions, at least one of which is operatively coupled to a driven roller, at least one of the end portions of the flexible belt being movable in a substantially vertical direction.

10 Claims, 7 Drawing Sheets

VARIABLE VOLUME SILO FOR IN-BULK SUPPLIED ARTICLES

BACKGROUND OF THE INVENTION

The present invention relates to a variable-volume silo for holding herein unbreakable articles supplied in bulk.

As is known, in a great number of on-line processes performed by processing apparatus operating with different speeds, it is necessary to arrange, between the upstream apparatus and the downstream apparatus, a storing silo for temporarily holding therein pieces or semifinished articles.

A main problem related to the above mentioned holding silos is that of preventing the articles being processes, which are usually fed by gravity, from falling through an excessively large height susceptible to damage or deform said articles.

In order to solve the above mentioned problem, prior apparatus conventionally comprise a flexible belt, made of a cloth material or the like, held inside a box-like body having inner smooth and parallel walls, which, in turn, is provided with an inlet region for feeding the articles into the silo, and an outlet region for unloading downstream said silo the desired articles. The mentioned flexible belt is entrained between the two end portions by a pair of driven rollers for varying the tension and extension of the belt depending on the volume occupied by the articles held in said silo.

Alternately, only one of the end portions of the flexible belt is driven, either for winding or unwinding, by one of the driven rollers.

However, the above approach, while allowing to control the falling height of the articles held in the silo by varying the tension of the flexible belt, does not allow to fully exploit the silo volume.

Thus, it would be necessary to design the silo with a volume greater than that which would be required by the making line, with a consequent increase of the costs.

SUMMARY OF THE INVENTION

Accordingly, the aim of the present invention is to provide a variable volume silo for holding therein articles supplied in bulk, which can be operated in a very flexible and unexpensive manner.

Within the scope of the above mentioned aim, a main object of the present invention is to fully exploit the available volume of the silo.

Yet another object of the present invention is to provide such a silo which is very simple construction wise and reliable in operation, while allowing articles held in said silo from rolling and being damaged.

According to one aspect of the present invention, the above mentioned aim and objects, as well as yet other objects, which will become more apparent hereinafter, are achieved by a variable volume silo for holding herein articles supplied in bulk, said silo comprising a box-like body, an inlet region for feeding said articles into said silo, outlet regions for unloading said articles downstream of said silo, a flexible belt element entrained between two end portions, at least one of which is operatively coupled to a driven roller, characterized in that at least one of said end portions of said flexible belt is movable in a substantially vertical direction.

According to a preferred embodiment of the present invention, the vertically movable end portion of said flexible belt is coupled to a driven roller.

According to another preferred embodiment of the present invention, one of said end portions of said flexible belt is coupled to a bulkhead connected to the outlet edge preventing said articles from accidentally falling into a region underlaying a holding cloth element.

According to a further preferred embodiment of the present invention, the flexible belt is driven for winding and unwinding by a pair of driven rollers, arranged at different heights, each of said rollers being adapted to independently slide along a vertical axis thereof.

According to a further preferred embodiment of the present invention, the silo comprises a pair of outlet regions, each arranged on opposite sides of the silo, a conveyor belt being associated with each said region.

According to yet another preferred embodiment of the present invention, the silo comprises a conveyor belt extending on the top of the flexible belt in order to supply said articles to said inlet region.

In particular, the feeding or supplying conveyor belt comprises a plurality of blades, each of which can be displaced between a first position substantially parallel to the conveyor belt and a second slanted position, thereat said pallet will engage the flow of said articles in order to offset them and supply them, by gravity, to the silo.

Moreover, said blades are each arranged on an opposite side of said conveyor belt and can be displaced in opposite directions in order to supply said articles to said silo in a substantially even manner.

BRIEF DESCRIPTION OF THE DRAWINGS

Further advantages and characteristics of the present invention will become more apparent hereinafter from the following detailed disclosure, given by way of an illustrative but not limitative example, with reference to the accompanying drawings, where.

DESCRIPTION OF THE PREFERRED EMBODIMENTS

In the following disclosure reference will be made to some preferred embodiments of the invention which have been illustrated by way of a not limitative example of several possible variations of the invention.

Figure 1:
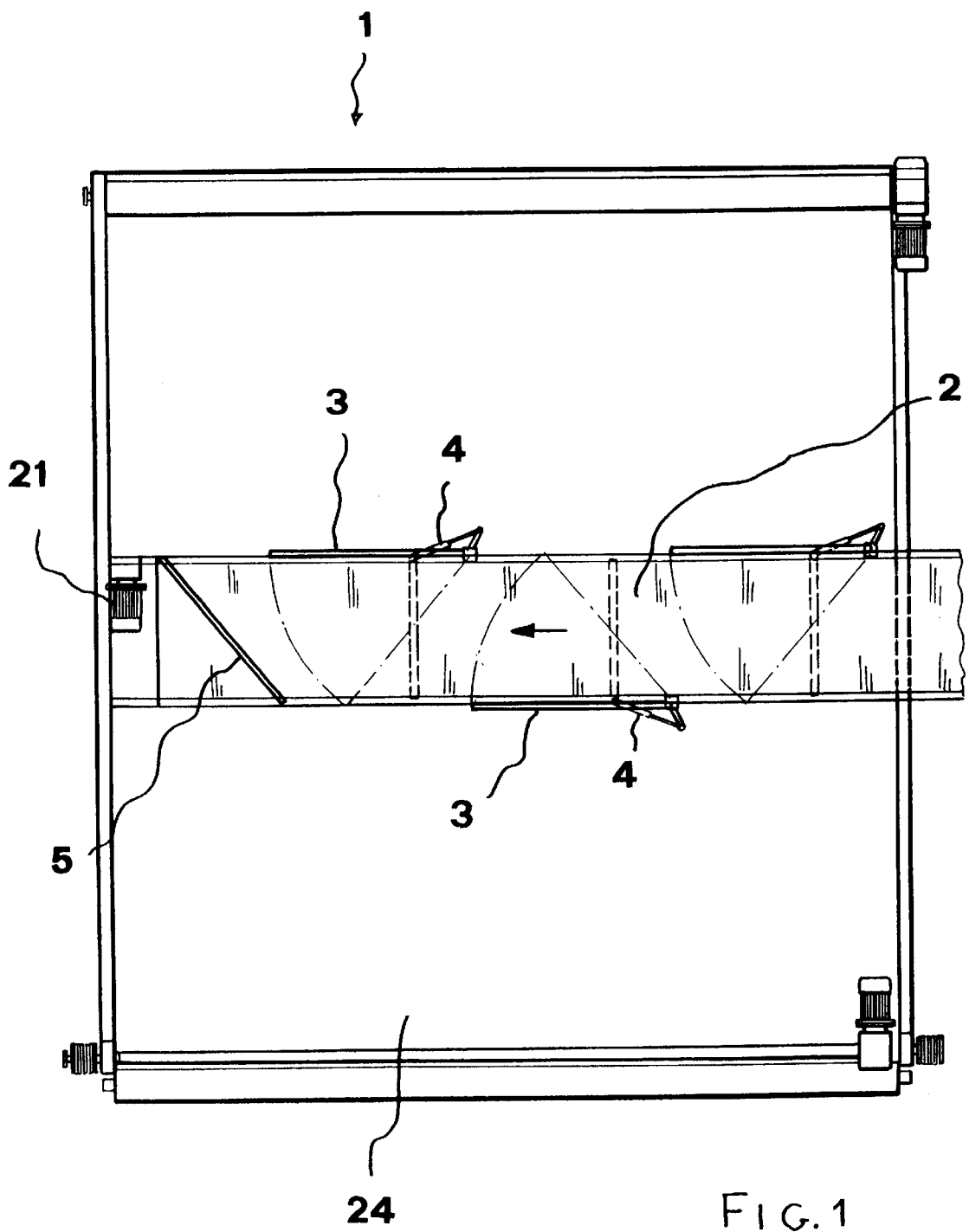
FIG. 1 is a top plan view of a first embodiment of the variable volume silo according to the present invention, in which is clearly shown a conveyor belt in order to supply articles to the silo.
Figure 2:
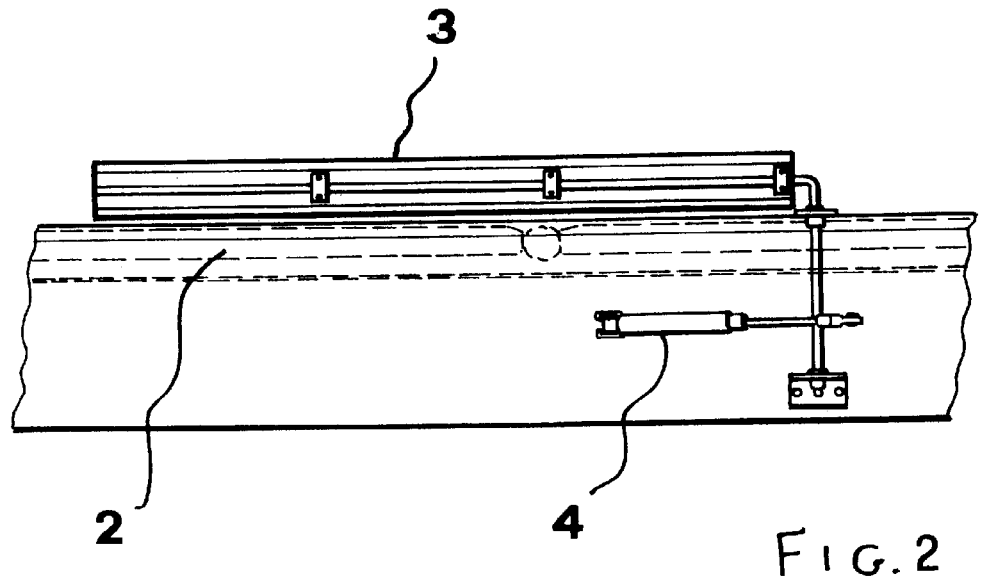
FIG. 2 is a side view of the article supplying or feeding conveyor belt.
Figure 3:
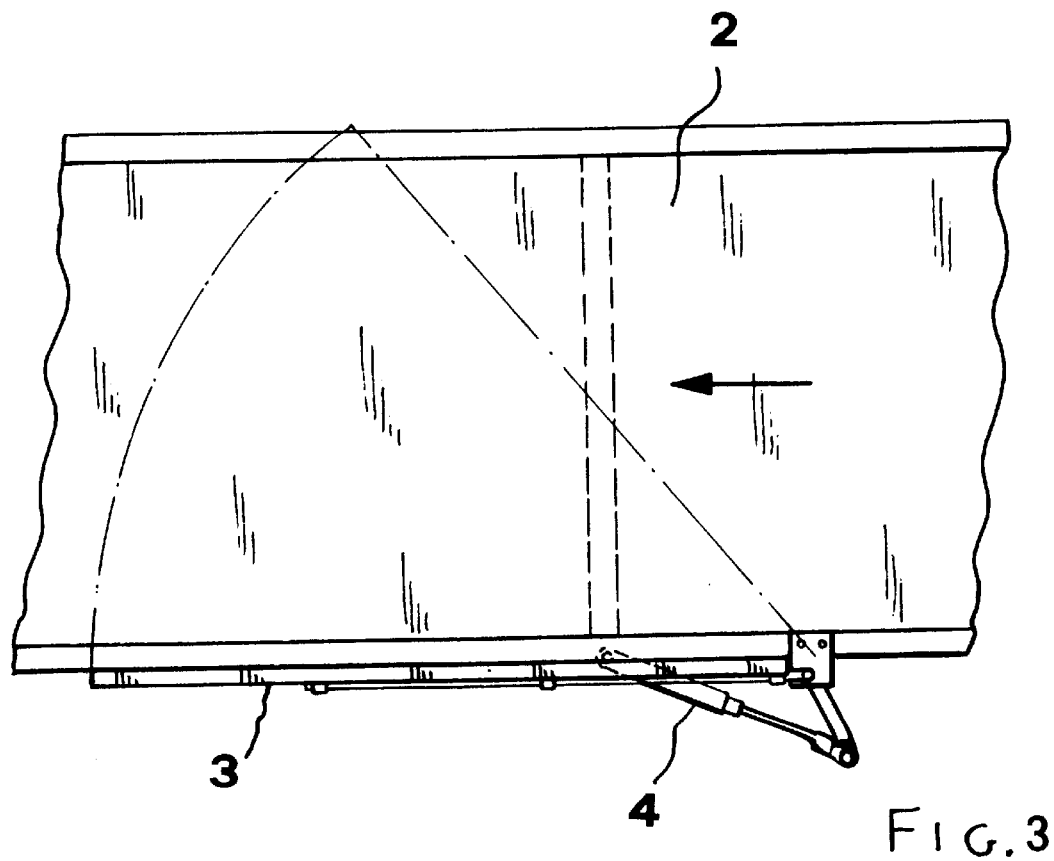
FIG. 3 is a top plan view of a portion of the conveyor belt shown in FIGS. 1–2.
Figure 4:
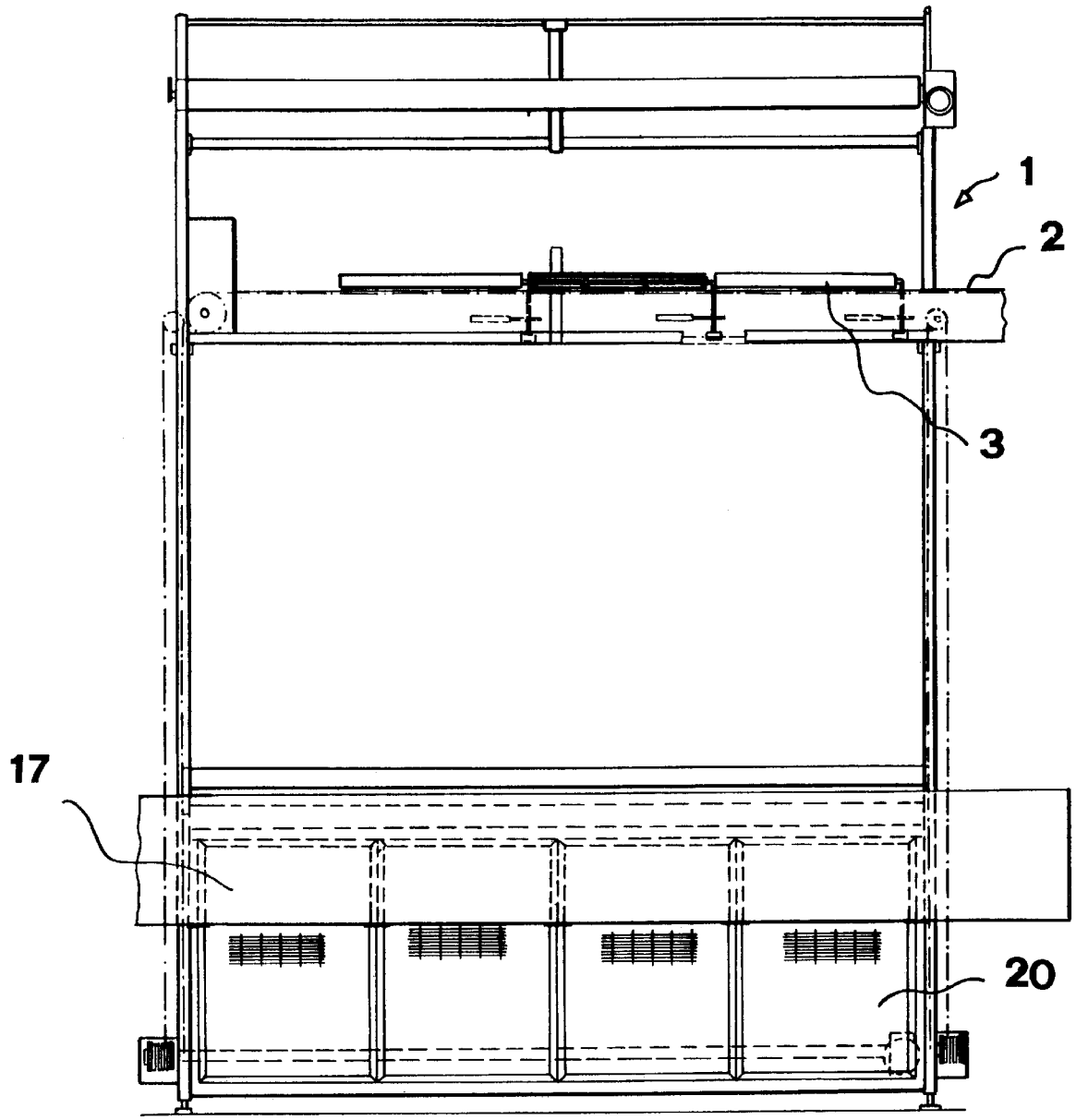
FIG. 4 is a front view of the variable volume silo.

FIG. 1 is a top plan view illustrating the variable volume silo according to the invention, generally indicated by the reference number 1. Said silo 1 comprises a box-like body, having a top portion for feeding the articles into said silo, and a front portion for unloading said articles downstream of said silo.

On the top portion of the silo 1 a conveyor belt 2 is provided, said conveyor belt being driven by a motor 21 for supplying articles to said silo 1. The latter further comprises a flexible belt or ribbon element 8, entrained between two end portions, and adapted to hold therein the articles being supplied to said silo 1.

As shown, the flexible belt 8 has an end portion thereof coupled to a roller driven by a motor 12 and the other end portion thereof coupled to a second roller in turn driven by the motor 13, the motor 12 being arranged above the outlet region 25 and being adapted to be controlled for either a winding or an unwinding operation.

The second end portion of the flexible belt element 8 is coupled to the closure bulkhead 20. The closure bulkhead 20 is rigid with the roller driven by the motor 13; said closure bulkhead being movable, in a substantially vertical direction, from a bottom position 15, shown in FIG. 5, to a top position 16 which, in said figure, is indicated by broken lines, and with the reference number 16, and being driven by the motor 13. Thus, the end portion of the flexible belt 8 will also move in a substantially vertical direction.

The flexible belt, 8 is moreover provided with cross reinforcement elements 35 allowing said belt, as it is loaded, to be bent without an excessive deformation toward the center thereof, while providing a lateral guide arrangement for said flexible belt.

In order to supply said articles to said silo 1, a conveyor belt 2 is provided on the top of the flexible belt 8. More specifically, the conveyor belt 2 comprises a plurality of blades 3, each of which can be displaced from a first position, substantially parallel to the conveyor belt 2, to a second slanted position, in which the blades 3 will engage the flow of articles being supplied to the silo 1 in order to offset said articles and cause them to be fed by gravity into said silo.

In particular, each of said blades 3 is arranged on an opposite side of the conveyor belt 2 and being provided with actuator means 4 in order to be displaced in opposite directions, thereby feeding said articles to said silo 1 in a substantially even manner.

At the end portion of the conveyor belt 2, a slanted profiled element 5 is provided in order to direct toward the silo 1 articles which have not been engaged by said blades 3.

The silo according to the present invention operates as follows.

The articles coming from an upward processing apparatus, are entrained by the conveyor belt 2 to be supplied to the silo 1. The blades 3 are driven, under the control of automatic logic control means, by actuator or driving means 4, adapted to cause said blades to be displaced from a position substantially parallel to the conveyor belt 2 to a position slanted with respect to said conveyor belt, thereby engaging the article flow to offset said article toward said silo 1.

Since said blades 3 are each arranged on an opposite side of the conveyor belt 2 and can be displaced in opposite directions, they will allow to properly feed said articles to said silo 1, in oder to cause said articles to fall, by gravity, on the flexible belt 8, in a substantially even manner, thereby preventing articles from dangerously concentrating on the flexible belt 8.

Figure 5:
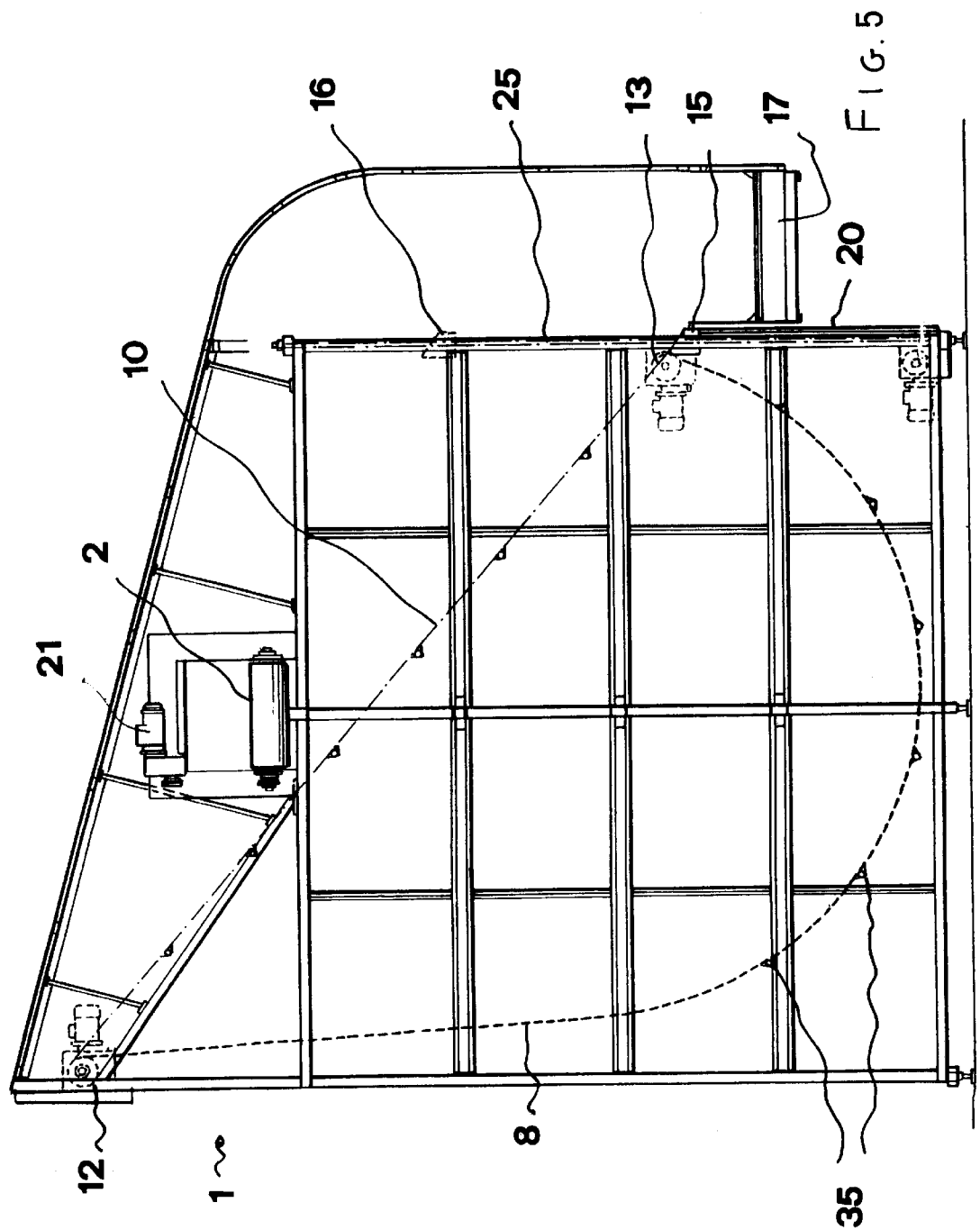
FIG. 5 is a side, cross-sectional view, of the variable volume silo.
Figure 6:
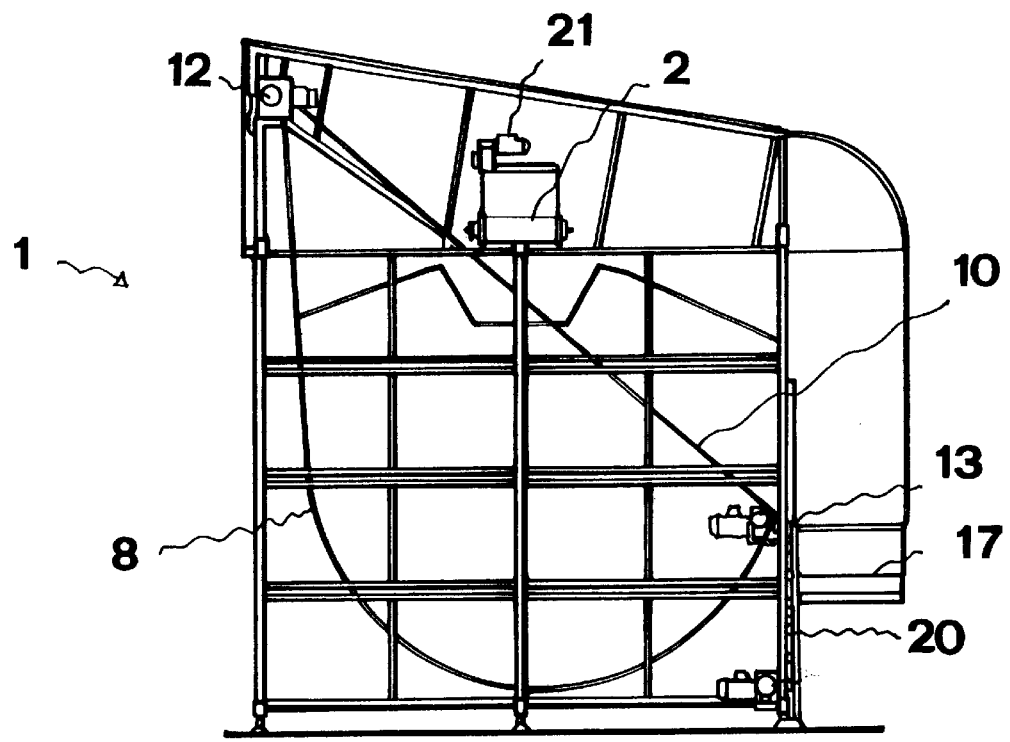
FIGS. 6–7 are side views respectively illustrating two different positions of one of the motors and of the movable bulkhead coupled thereto.
Figure 7:
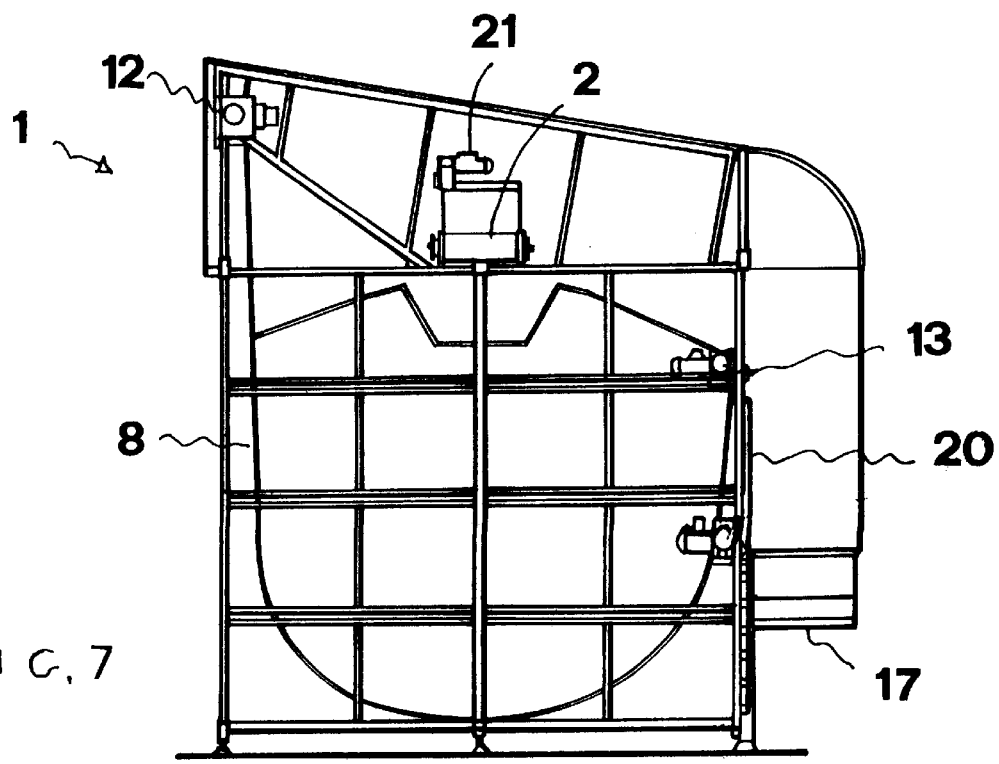
Figure 8:
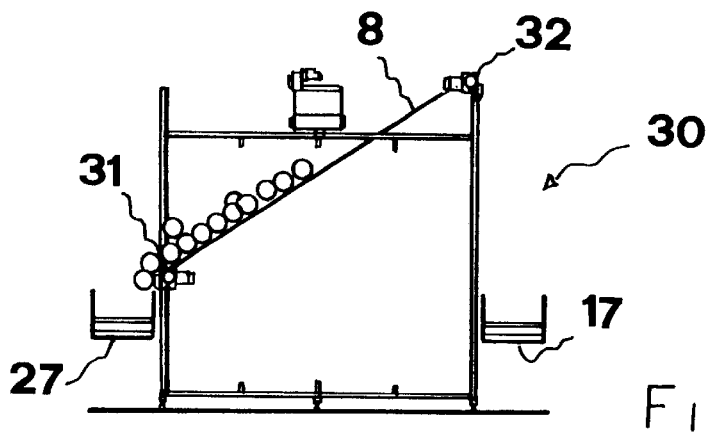
FIGS. 8–14 are further side views respectively illustrating different modes of operations of the motors included in a second embodiment of the silo according to the present invention.
Figure 9:
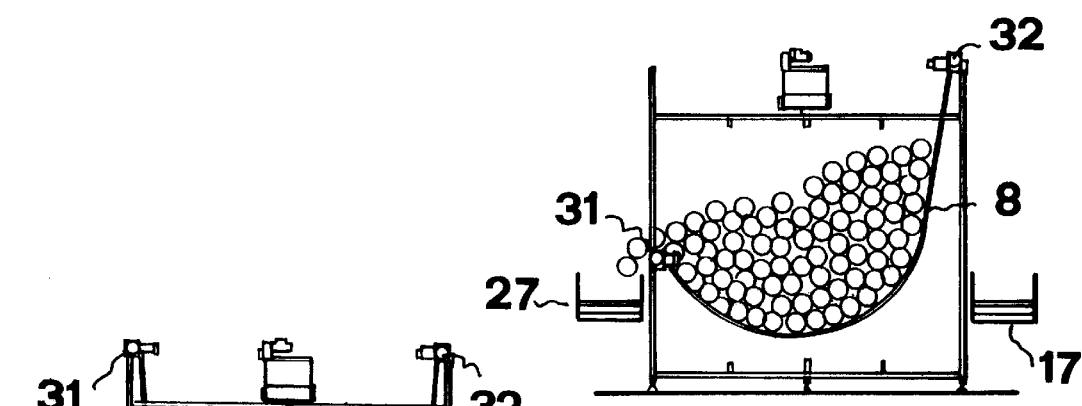
Figure 10:
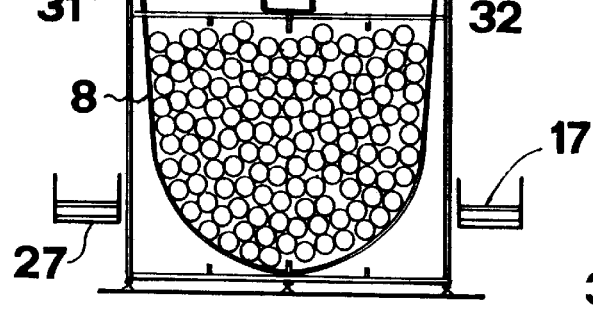
Figure 11:
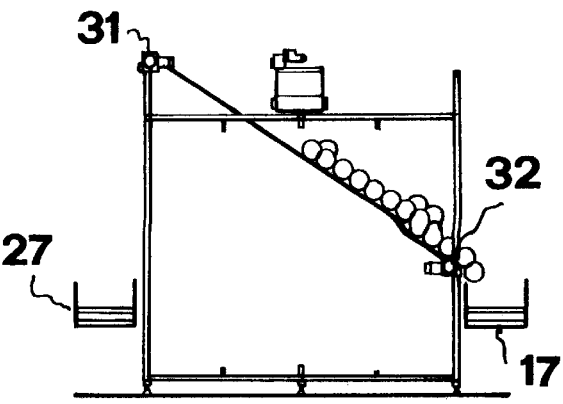
Figure 12:
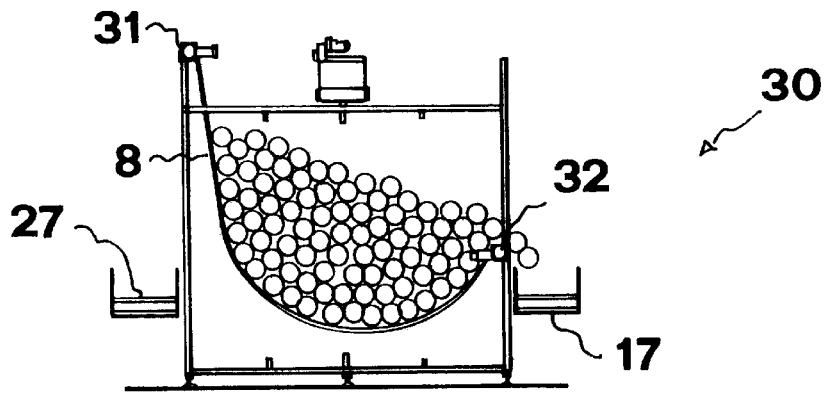
Figure 13:
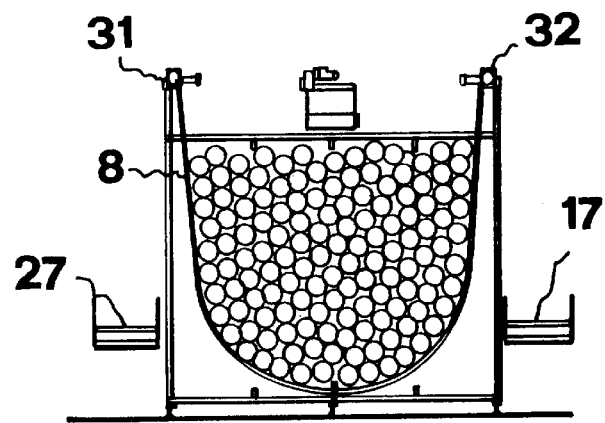
Figure 14:
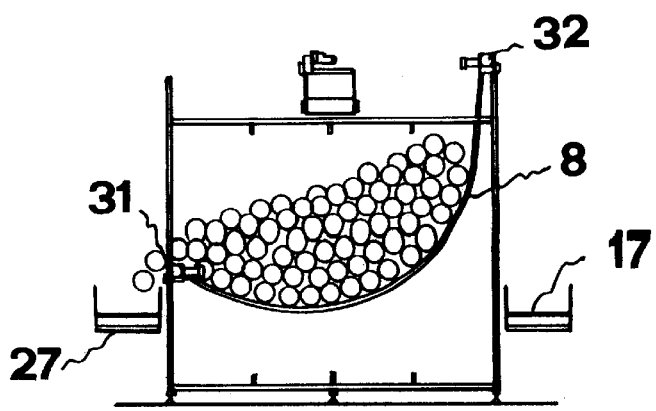

The operating positions of said flexible belt 8 of said silo 1 can vary from a first arrangement in which said flexible belt is fully unwound and forms, in cooperation with the side walls of said silo 1, a bag for holding therein said articles, and a second arrangement, indicated in FIG. 5 by the slanted line 10, in which the cloth element will be arranged in a tensioned configuration so as to define a slanted plane.

In this second arrangement, said articles can slide toward the outlet region 25, to be fed to a downstream apparatus, for example by falling on a conveyor belt 17.

The silo 1, moreover, can also operate, depending on requirements, by continuously modifying the arrangement of the flexible belt 8, by operating the respective driving motors.

In fact, it is also possible to drive the second end portion of the flexible belt 8, as shown in FIGS. 8–14, which illustrate a second preferred embodiment of the inventive silo, generally indicated by the reference number 30.

In this embodiment, motors 31 and 32 and respective driven rollers are used, so as to cause the flexible belt 8 to be wound and unwound, to properly perform the loading and unloading steps on said articles, depending on the production rate or speed of the upstream apparatus and the downstream apparatus.

The provision of two driven rollers will allow the silo 1 to be used in a very flexible manner. In fact, the rollers can be operated either in a winding or in an unwinding mode of operation, as said articles are loaded and unloaded respectively.

Owing to the above operation modes, it will be possible to properly control the tension of the belt 8 thereby preventing the articles held in said silo from undesirably rolling, or from being damaged.

More specifically, the control of the instantaneous operating conditions as well as of the related movements of the flexible belt 8 is performed automatically by using apparatus known per se, adapted to detect the operating parameters and provide the instructions necessary for modifying dynamically, by the driving elements, the configuration of the flexible belt 8.

As two driven rollers are used, it will be also possible to provide the lowermost driven roller with a vertical movement in order to increase the useful volume of the silo 1.

More specifically, in the embodiment 30, each said driven roller can slide independently along a dedicated vertical axis.

This will allow, depending on requirements, to unload articles either on the right or on the left side of the silo 30.

To that end, in fact, a pair of outlet regions are provided, each arranged on opposite sides of the conveyor belt 2, each said region being associated with an outlet conveyor belt, respectively indicated by 17 and 27.

The silo according to the invention can be used for temporarily holding therein unbreakable articles of very different types, such as vials, bottles, vats or any work pieces susceptible to be made in series by molding, blowing, injecting apparatus and the like.

For great size systems, it would be possible to use a plurality of silos according to the present invention, to be arranged adjoining one another, possibly also on opposite sides, of a same outlet conveyor belt.

What is claimed is:

1. A variable volume silo for holding therein articles supplied in bulk, comprising a box-like body, an inlet region for feeding said articles into said silo, outlet regions for unloading said article downstream of said silo, a flexible belt element entrained between two end portions, at least one of which is operatively coupled to a driven roller, characterized in that at least one of said end portions of said flexible belt is movable in a substantially vertical direction.

2. A variable volume silo for holding therein articles supplied in bulk, according to claim 1, characterized in that said end portion of said flexible belt, movable in a substantially vertical direction, is coupled to a driven roller.

3. A variable volume silo for holding therein articles supplied in bulk, according to claim 1, characterized in that one of said end portions of said flexible belt is coupled to a roller coupled to a diaphragm connected to an outlet edge preventing said articles from accidentally falling into a region underlaying a holding cloth element.

4. A variable volume silo for holding therein articles supplied in bulk, according to claim 2, characterized in that said flexible belt is driven either in a winding or in an unwinding operation, by a pair of driven rollers arranged at different heights.

5. A variable volume silo for holding therein articles supplied in bulk, according to claim 4, characterized in that each said roller is adapted to vertically displace an axis thereof, independently from a position assumed by the other roller.

6. A variable volume silo for holding therein articles supplied in bulk, according to claim 1, characterized in that said silo comprises moreover a pair of outlet regions, each arranged on an opposite side of a conveyor belt for feeding said articles to said silo, each said outlet region being coupled to an outlet conveyor belt.

7. A variable volume silo for holding therein articles supplied in bulk, according to claim 4, characterized in that said rollers are automatically controlled to prevent said articles from rolling and tilting.

8. A variable volume silo for holding therein articles supplied in bulk, according to claim 7, characterized in that said conveyor belt comprises a plurality of blades, rigid with said conveyor belt, each said blade being displaceable between a first position substantially parallel to said conveyor belt and a second slanted position in which said blade will engage a flow of said articles in order to offset and supply said articles, by gravity, to said silo.

9. A variable volume silo for holding therein articles supplied in bulk, according to claim 8, characterized in that said blades are each arranged on an opposite side of said conveyor belt and can be displaced in opposite directions, so as to supply to said silo said articles in a substantially even manner.

10. A variable volume silo for holding therein articles supplied in bulk, according to claim 1, characterized in that said flexible belt is provided with cross reinforcement elements to allow said flexible belt to be bent without excessive deformations, with respect to reinforcement lines parallel to said cloth element winding axes, wherein said reinforcement elements also operate as side guide elements for said cloth element during the movement thereof.

* * * * *